Nov. 4, 1969  M. W. BANG  3,477,057
POTENTIOMETER WITH FRICTIONAL SLIDE
Filed Oct. 12, 1967  2 Sheets-Sheet 1
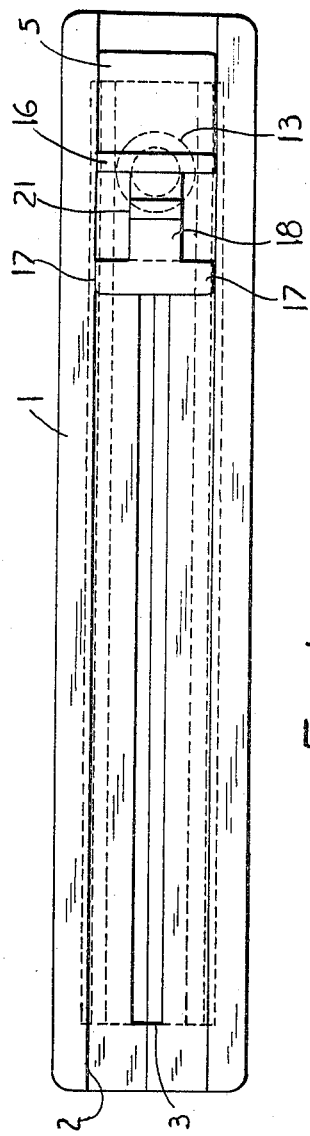
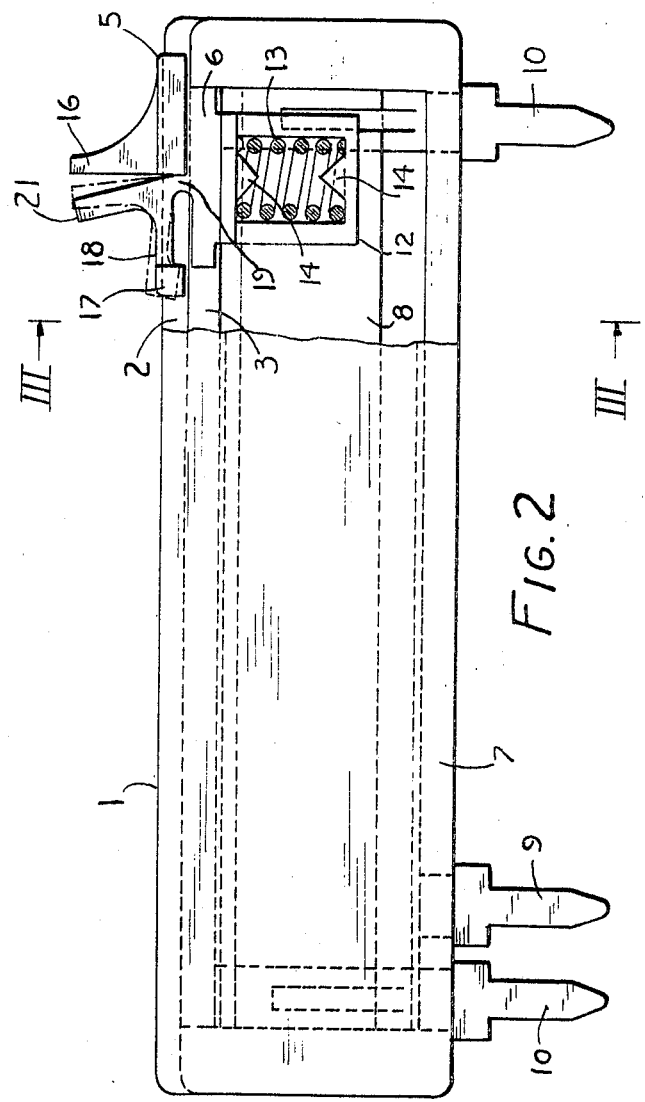
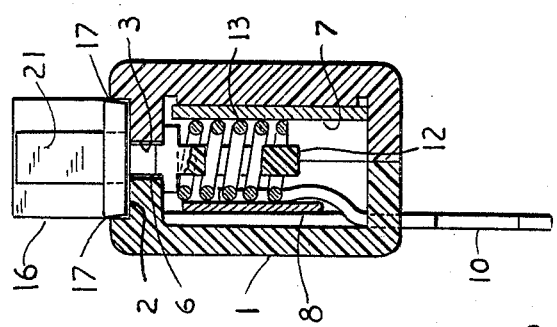
INVENTOR.
MOGENS W. BANG
BY
Brown, Critchlow, Flick & Peckham.
ATTORNEYS.

Nov. 4, 1969  M. W. BANG  3,477,057

POTENTIOMETER WITH FRICTIONAL SLIDE

Filed Oct. 12, 1967  2 Sheets-Sheet 2

INVENTOR.
MOGENS W. BANG
BY
Brown, Critchlow, Flick & Peckham.
ATTORNEYS.

United States Patent Office 3,477,057
Patented Nov. 4, 1969

3,477,057
POTENTIOMETER WITH FRICTIONAL SLIDE
Mogens W. Bang, Ridgway, Pa., assignor to Stackpole Carbon Company, St. Marys, Pa., a corporation of Pennsylvania
Filed Oct. 12, 1967, Ser. No. 674,849
Int. Cl. H01c 5/02
U.S. Cl. 338—182          11 Claims

ABSTRACT OF THE DISCLOSURE

The elongated case of a linear motion potentiometer is provided in one of its side walls with a longitudinal slot through it. A slide in the slot is movable lengthwise of it manually for sliding a bridging contact along a collector and resistance element in the case. The slide is provided with a friction portion resiliently pressing against the case to resist movement of the slide along the slot.

---

It is among the objects of this invention to provide a potentiometer with a contact-moving slide which will stay in any position to which it is moved when the potentiometer is adjusted, but which can be moved manually very easily when desired.

In accordance with this invention, the slide is provided with one or more friction portions that are urged against the case, but permit the slide to be moved whenever it is desired to do so.

The invention is illustrated in the accompanying drawings, in which

Figure 6:
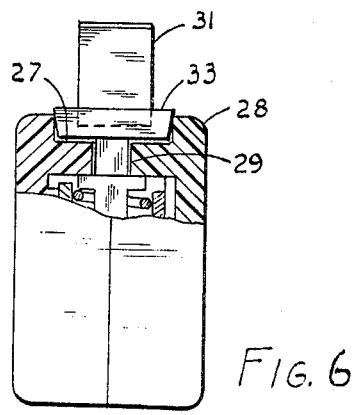
Figure 4:
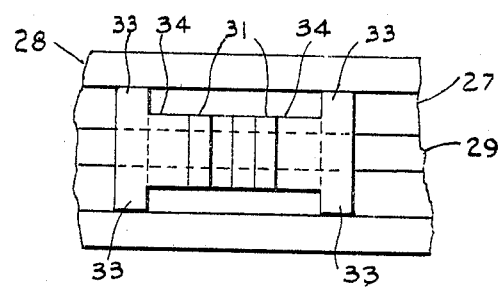
Figure 7:
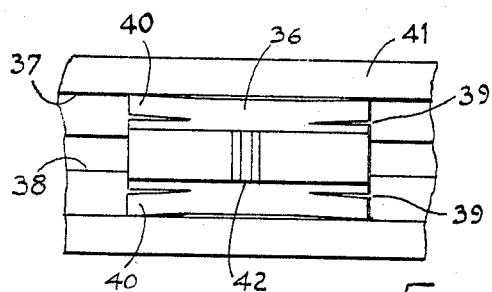
Figure 5:
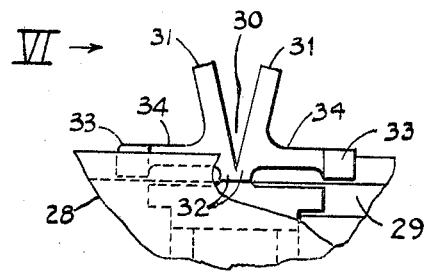
Figure 8:
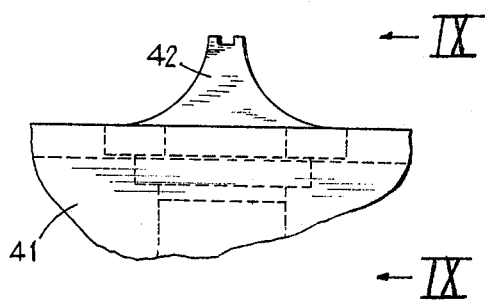
Figure 9:
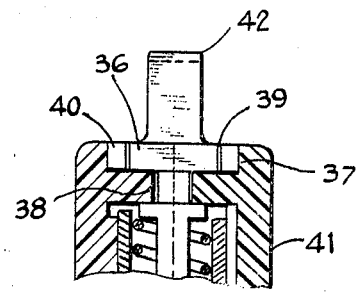

FIG. 1 is a front view of a potentiometer;
FIG. 2 is a side view thereof with parts broken away;
FIG. 3 is a cross section taken on the line III—III of FIG. 2;
FIG. 4 is a fragmentary plan view of a modification;
FIG. 5 is a fragmentary side view, partly broken away;
FIG. 6 is a cross section on the line VI—VI of FIG. 5; and
FIGS. 7, 8 and 9 are views corresponding, respectively, to FIGS. 4, 5 and 6, of a further embodiment of the invention.

Referring to FIGS. 1 to 3 of the drawings, the long rectangular case 1 of a potentiometer may be formed from any suitable material, such as a molded plastic or other rigid material. Preferably the case is made from two molded half sections that have meeting edges extending from front to back across the end of the case and lengthwise along its back or base. The half sections are joined together in any suitable manner, such as by adhesive for example. The front or top of the case is provided centrally with an outside recess 2 extending lengthwise of the case, usually for its full length. The same wall of the case has a slot 3 through it extending along the central portion of the recess.

Slidably mounted in the slot for movement lengthwise in the case is a slide 5 that has laterally opening grooves 6 receiving the side walls of the slot so that the slide is locked in the slot and can move only lengthwise in it. A metal collector strip 7 and an electrical resistor strip 8 are mounted inside the case on opposite sides thereof. The collector strip is provided with an integral terminal 9 that extends through the back of the case, while each end of the resistor strip is connected to a metal terminal 10 likewise extending through the back.

Inside the case an open frame 12, integral with the slide, extends between the two strips. The plane of the frame extends lengthwise of the slide and is parallel to the strips. Preferably, the frame is rectangular, with the inner side of the slide forming one side of it. Disposed in this frame is a wire coil 13, the axis of which is perpendicular to the slide. The coil is held in place by a pair of projections 14 integral with the frame and extending a short distance into the opposite ends of the coil. The coil projects from the opposite sides of the frame and slidingly engages both of the strips, thereby forming a bridging contact between them.

In accordance with this invention, one end portion of the slide, equal to about one half its length, has at its inner end an integral outwardly projecting operating member 16 that is used in moving the slide back and forth in the slot. The opposite sides of this end portion may engage the opposite side walls of the case recess 2, but they do not press against it. The other end portion of the slide has at its outer end two corner portions 17 that engage the side walls of the recess. The wall-engaging surfaces of these friction portions preferably converge toward the case so that the slide appears slightly wedge-shape when viewed from the end, as shown in FIG. 3. The corner portions 17 are joined to the outer end of a rigid portion 18, which generally is narrower than the ends of the slide and which is connected to the rest of the slide by a transverse integral elastic portion 19, as shown in FIG. 2. This portion will permit the adjoining narrow portion and friction portions 17 of the slide to be tilted outwardly away from the case. On the other hand, the elastic portion is strong enough to normally urge corner portions 17 toward the bottom of the case recess in order to wedge them between the sides of the recess. This wedging produces enough friction to securely hold the slide in any position along the case to which it is moved.

Since the friction between the slide and case resists accidental movement of the slide, it is desirable to reduce that friction when it is wished to move the slide. For this purpose the inner end of the tiltable portion of the slide is provided with an outwardly extending operating member in the form of a lug 21 that normally is inclined outwardly from operating member 16 beside it. When it is desired to move the slide, the two operating members are squeezed between the fingers, which causes the tiltable one to swing toward the stationary one and thereby spring corner portions 17 of the slide away from the case far enough to release their frictional engagement with the sides of the recess. The slide can easily be moved along the case to the desired position, whereupon the operating members are released so that elastic portion 19 will swing the friction corner portions back into the recess and wedge the slide in place again.

In the first modification, shown in FIGS. 4, 5 and 6, the part of the slide disposed in longitudinal recess 27 in the potentiometer case 28 is joined to the part of the slide in slot 29 only in a short central area that is separated centrally by a transverse V-notch 30. The sides of the notch are lengthened by the opposed sides of a pair of diverging operating members 31, each of which is integrally connected to the inner end of an end portion of the slide. Where these end portions join the part of the slide in the slot, elastic portions 32 are formed. The corner portions 33 of the slide have inwardly inclined surfaces that wedge against the side walls of recess 27. The portions 34 of the slide connecting these corner portions with the elastic portions preferably are materially narrower than the recess to make sure that the corners can seat against the recess walls. Normally, as can be seen, the slide will be wedged in place, but it can be released for easy movement along the slot by simply squeezing operating members 31 toward each other slightly to raise the corner portions 33 out of frictional engagement with the case until the slide reaches its new location along the case.

In the second modification, shown in FIGS. 7, 8 and 9, the slide 36 is not provided with any friction-releasing member. Instead, the rectangular portion of the slide in the case recess 37 is rigidly joined to the portion of the slide in the case slot 38. Most of the exposed part of the slide is spaced slightly from the opposite side walls of the recess. Extending lengthwise of the slide from each end near each corner there is a slit 39 that separates the corner portion 40 of the slide from the rest of it, except at the inner end of the corner portion. These corner portions, when they are formed, are bent laterally away from the rest of the slide. This can be done during molding or in a subsequent operation. It is important that the total width of each end of the slide before it is mounted in the case be slightly greater than the distance between the side walls of the case recess. Therefore, when the slide is mounted in slot 38 the laterally projecting corner portions have to be pressed inwardly slightly in order to fit in recess 37. The result is that the corner portions of the slide are biased outwardly against the side walls of the recess and produce considerable friction between the slide and the case 41. The slide is provided with a projecting knob 42 by which it can be moved along the slot when sufficient force has overcome the friction between the slide corners and case.

Instead of the friction portions of the slides pressing against the side walls of a recess, which is preferred, the hinged end or ends of a slide can be made narrow enough to press down against the wall of the case between the recess side walls. That would necessarily be the construction if the slotted wall of the case had no recess, such as the potentiometer shown in my copending patent application, Serial Number 538,761, now Patent No. 3,362,004. With such a case, the corner portions of the slide shown in FIGS. 7 to 9 would be biased toward the slotted wall rather than outwardly.

According to the provisions of the patent statutes, I have explained the principle of my invention and have illustrated and described what I now consider to represent its best embodiment.

I claim:

1. An infinitely variable linear motion potentiometer comprising an elongated case provided in one of its side walls with a central longitudinal slot therethrough spaced parallel resistor and collector strips mounted in the case and extending lengthwise thereof, terminals connected to the strips and extending out of the case, a bridging contact in the case in sliding engagement with both strips, a manually operable slide disposed in said slot and movable lengthwise thereof to any position along the case and means connecting the slide with said contact for moving the contact lengthwise of the strips, the slide being provided integrally with a friction portion outside the case resiliently pressing against the outer surface of the case to resist movement of the slide along the slot.

2. A potentiometer according to claim 1, in which said slotted wall of the case is provided outside with a longitudinal recess containing said slide, and said friction portion has surfaces normally engaging the opposite side walls of said recess.

3. A potentiometer according to claim 1, in which said slide is provided with manually operable means for withdrawing said friction portion from engagement with the case to facilitate movement of the slide.

4. A potentiometer according to claim 1, in which said friction portion is at an end of the slide rigidly connected to a central transverse elastic portion permitting said end to be tilted away from the case, the slide being provided with an operating member extending away from the case for tilting said end to facilitate movement of the slide, and said end being swung back toward the case by said elastic portion when said operating member is released.

5. A potentiometer according to claim 4, in which said slotted wall of the case is provided outside with a longitudinal recess containing said slide, and said friction portion has surfaces normally engaging the opposite side walls of said recess.

6. A potentiometer according to claim 1, in which there are two of said friction portions, said portions are at opposite ends of the slide and joined to rigid portions integrally joined at their inner ends to the remainder of the slide by transverse elastic portions, and the slide is provided with stiff operating members joined to the inner ends of said rigid portions and diverging away from the case, whereby when said members are squeezed together said friction portions will be removed from engagement with the case to facilitate movement of the slide, said friction portions being swung back toward the case by said elastic portions when said operating members are released.

7. A potentiometer according to claim 6, in which said slide is engageable with the inner surface of the slotted case wall, and said hinge portions are engageable with the outer surface of said wall.

8. A potentiometer according to claim 1, in which there are a plurality of said friction portions extending lengthwise of the slide and joined at only one end to the remainder of the slide and otherwise spaced from said remainder and biased laterally away from it.

9. A potentiometer according to claim 1, in which there are a plurality of said friction portions, and said portions are laterally-biased corner portions of the slide separated from the remainder of the slide by slits extending longitudinally of the slide inwardly from its ends.

10. A potentiometer according to claim 1, in which there are a plurality of said friction portions, the slide is provided near each corner with a longitudinal slit extending inwardly from the end of the slide to form one of said portions, the slotted wall of the case is provided outside with a longitudinal recess containing said slide, and each of said friction portions is inclined laterally into frictional engagement with the adjoining side wall of said recess.

11. A potentiometer according to claim 1, in which said friction portion is at an end of the slide rigidly connected to a central transverse elastic portion of the slide that presses said friction portion against said outer surface of the case.

References Cited

UNITED STATES PATENTS 3,307,133    2/1967    Wolff _____ 338—183

LEWIS H. MYERS, Primary Examiner

A. T. GRIMLEY, Assistant Examiner

U.S. Cl. X.R.

338—183